United States Patent
Higuchi

(10) Patent No.: US 6,683,742 B2
(45) Date of Patent: Jan. 27, 2004

(54) MAGNETIC TAPE DRIVE HAVING A MECHANISM FOR PREVENTING SLACK IN A MAGNETIC TAPE

(75) Inventor: Yoshio Higuchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 358 days.

(21) Appl. No.: 09/851,788

(22) Filed: May 9, 2001

(65) Prior Publication Data

US 2002/0030919 A1 Mar. 14, 2002

(30) Foreign Application Priority Data

May 9, 2000 (JP) ................................. P. 2000-135348

(51) Int. Cl.⁷ .................. G11B 15/48; G11B 15/18; G11B 15/12
(52) U.S. Cl. ....................... 360/74.1; 360/69; 360/61
(58) Field of Search ................ 360/74.1; 318/375, 318/7

(56) References Cited

U.S. PATENT DOCUMENTS 3,946,291 A * 3/1976 Marheine .................. 318/7
4,481,449 A * 11/1984 Rodal ...................... 318/375

FOREIGN PATENT DOCUMENTS

| JP | Hei2-26136 | 2/1990 |
| JP | 2513648 | 3/1994 |
| JP | 2513649 | 3/1994 |
| JP | 3039425 | 7/1997 |

* cited by examiner

Primary Examiner—David Hudspeth
Assistant Examiner—Mitchell Slavitt
(74) Attorney, Agent, or Firm—Rosenthal & Osha L.L.P.

(57) ABSTRACT

A magnetic tape drive has a brake mechanism section which can transfer the state of a reel table from a non-brake state to a brake state by using an electric power that remains after a start of a power failure of a commercial power source. The drive further has a first power failure detecting section which, when a power failure of the commercial power source is detected, transmits a first power failure detection signal; and a controlling section which, when the first power failure detection signal is transmitted in a fast-forwarding state or a rewinding state, transfers the non-brake state of the brake mechanism section to the brake state.

2 Claims, 3 Drawing Sheets

MAGNETIC TAPE DRIVE HAVING A MECHANISM FOR PREVENTING SLACK IN A MAGNETIC TAPE

BACKGROUND OF THE INVENTION

1. Field of the Invention

The present invention relates to a magnetic tape drive in which, when a power failure is detected in a fast-forwarding state or a rewinding state, a reel table is transferred from a non-brake state to a brake state.

2. Related Art

When a power failure occurs during a process of fast-forwarding or rewinding a magnetic tape, the magnetic tape slackens. Conventionally, as a countermeasure against such a situation, a technique is proposed in the Unexamined Japanese Utility Model Application Publication No. Hei2-26136. In the proposed technique, remaining amount detecting means for detecting the remaining amount of a loaded magnetic tape is disposed, and also power failure detecting means for detecting a failure of a supplied power and outputting a power failure detection signal is disposed. Furthermore, storage means for receiving the power failure detection signal, and for storing the tape remaining amount at a timing when the power failure detection signal is generated, as a power-failure tape remaining amount is disposed. When the power failure is then eliminated, the magnetic tape is rewound in one direction by a predetermined amount, and thereafter caused to run in the other direction. The tape remaining amount which is detected at this time is compared with the tape remaining amount at the stop. If the amounts coincide with each other, the running of the magnetic tape is stopped. After the power failure is eliminated, therefore, the magnetic tape is returned to the state where there is no slackening.

Problems to be Solved

When the above-mentioned configuration is used, there arises the following problem. In the case where the fast-forwarding or rewinding operation is performed at a high speed in order to shorten the time period required for the operation, when a power failure occurs during the fast-forwarding or rewinding operation, the magnetic tape slackens in a larger amount. When the magnetic tape is then caused to run in the slackened state, therefore, the magnetic tape is easily tangled with a guide pin disposed in the running path, or twisted, thereby producing a fear that the magnetic tape may be broken.

SUMMARY OF THE INVENTION

The invention has been conducted in order to solve the problem. It is an object of the invention to provide a magnetic tape drive in which, when a power failure is detected in a fast-forwarding state or a rewinding state, the state of a reel table is transferred by using an remaining electric power from a non-brake state to a brake state, whereby, even when the power failure occurs in the fast-forwarding state or the rewinding state, a magnetic tape can be prevented from slackening.

It is another object of the invention to provide a magnetic tape drive in which, when a switching circuit is in an on state, a power failure is detected on the basis of a voltage appearing in a secondary coil to enable the power failure to be detected at an earlier timing, whereby the remaining electric power for transferring the state of a reel table from a non-brake state to a brake state can be sufficiently ensured.

It is a further object of the invention to provide a magnetic tape drive in which a power failure detecting section that transmits a second power failure detection signal at a timing which is later than a timing when a first power failure detection signal instructing the transfer of a reel table from a non-brake state to a brake state is disposed, and, even in the case where the first power failure detection signal is transmitted, when the second power failure detection signal is not transmitted, a normal mode is continued, whereby, also when the time period of an instantaneous power failure is relatively long, the mode is prevented from being transferred to a sleep mode.

Means for Solving the Problems

In order to solve the problem, the invention is applied to a magnetic tape drive comprising a brake mechanism section which can transfer a state of a reel table from a non-brake state to a brake state by using an electric power that remains after a start of a power failure of a commercial power source, wherein the magnetic tape drive further comprises: a first power failure detecting section which, when a power failure of the commercial power source is detected, transmits a first power failure detection signal; and a controlling section which, when the first power failure detection signal is transmitted in a fast-forwarding state or a rewinding state, transfers the non-brake state of the brake mechanism section to the brake state.

When a power failure occurs in a fast-forwarding state or a rewinding state, the state of the brake mechanism section is transferred from the non-brake state to the brake state.

In addition to the above configuration, the invention is applied to a magnetic tape drive wherein the magnetic tape drive further comprises a switching power source which, when a switching circuit for switching a current flowing through a primary coil of a transformer is in an off state, takes out an output from a secondary coil of the transformer, and the first power failure detecting section transmits the first power failure detection signal on the basis of a voltage of the secondary coil of the transformer when the switching circuit is in an on state.

On the basis of the voltage of the secondary coil of the transformer when the switching circuit is in an on state, a power failure can be detected before the DC output voltage of the switching power source is lowered. In other words, the first power failure detection signal can be transmitted at a time when a large electric power remains in the switching power source.

In addition to the above configuration, the invention is applied to a magnetic tape drive wherein the controlling section is configured by a microcomputer having a normal mode, and a sleep mode which consumes a less power than the normal mode, the magnetic tape drive further comprises a second power failure detecting section which, when a power failure occurs, transmits a second power failure detection signal at a timing which is later than a timing when the first power failure detecting section transmits the first power failure detection signal, and also in a case where the first power failure detection signal is transmitted, the controlling section continues the normal modes when the second power failure detection signal is not transmitted, and is transferred from the normal mode to the sleep mode when the second power failure detection signal is transmitted.

When a power failure is eliminated during a period from the transmission of the first power failure detection signal to that of the second power failure detection signal, the transfer to the sleep mode is not performed.

DETAILED DESCRIPTION OF THE PREFERRED EMBODIMENTS

Mode for Carrying Out the Invention

Hereinafter, an embodiment of the invention will be described with reference to the drawings.

Figure 2:
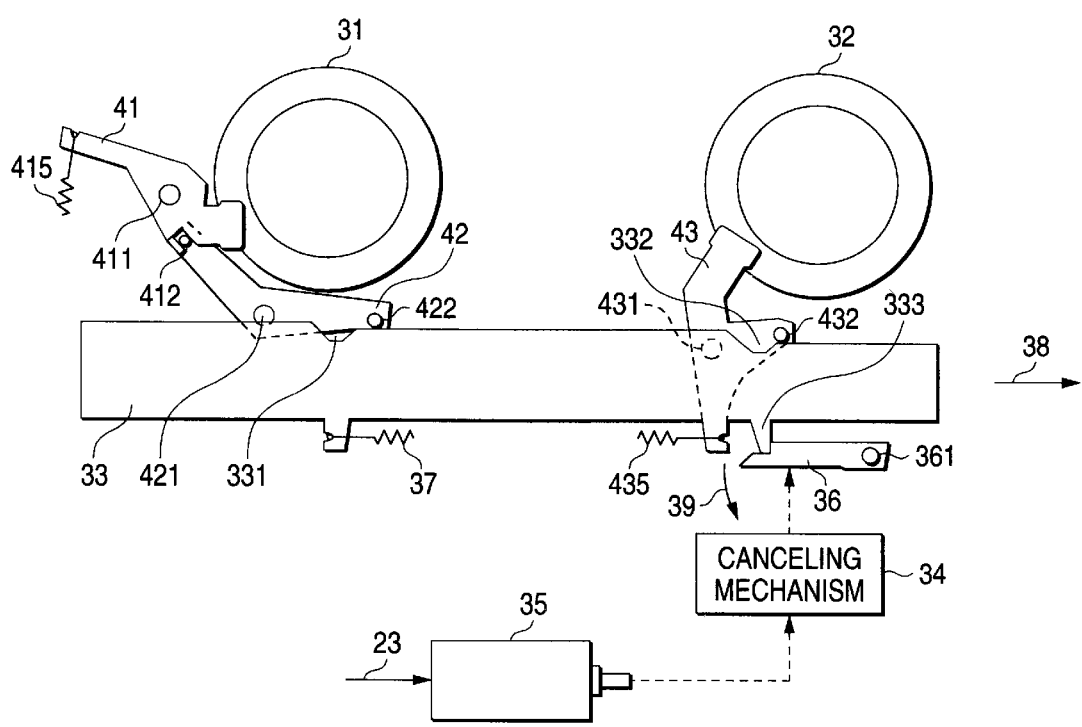
FIG. 2 is a diagram showing the configuration of a brake mechanism section in the embodiment.

FIG. 2 is a diagram showing the configuration of a brake mechanism section in an embodiment of the magnetic tape drive (video cassette recorder) according to the invention.

The brake mechanism section has a configuration which enables the state of a reel table to be transferred from a non-brake state to a brake state by an electric power which remains after a power failure of a commercial power source. Namely, the section is configured so that reel tables 31 and 32 are set to the non-brake state against the urging forces of springs 415 and 435, and, when a driving output 23 is given in the non-brake state, the reel tables 31 and 32 are transferred to the brake state by the urging forces.

Specifically, a center portion of a brake lever 41 which is opposed to the supply reel table 31 is rotatably journalled to a chassis (not shown) via a journal shaft 411. A lever member 42 one end of which is connected to one end of the brake lever 41 via a connecting pin 412 is rotatably journalled to the chassis via a journal shaft 421. A cam pin 422 which is engaged with a cam face 335 of a mode switch lever 33 protrudes from the other end of the lever member 42.

A center portion of a brake lever 43 which is opposed to the take-up reel table 32 is rotatably journalled to the chassis via a journal shaft 431. A cam pin 432 which is engaged with the cam face 335 of the mode switching lever 33 protrudes from one end of the brake lever 43. The spring 415 is engaged with the brake lever 41, and the spring 435 is engaged with the brake lever 43. A spring 37 is engaged with the mode switch lever 33.

An engaging protrusion 333 is formed on the mode switch lever 33. One end of an engagement lever 36 which is engaged with the engaging protrusion 333 is rotatably journalled to the chassis via a journal shaft 361. A canceling mechanism (the specific configuration of which is not shown) 34 is disposed which allows the engagement lever 36 to swing in the direction of the arrow 39, simply by slightly rotating a loading motor 35 in a predetermined direction (hereinafter, this direction is referred to as cancellation direction).

In the figure, the mode switch lever 33 is in the position corresponding to the fast-forwarding state and the rewinding state. Namely, the figure shows the state where the brake lever 41 is separated from the supply reel table 31, and the brake lever 43 is separated from the take-up reel table 32, so that the supply reel table 31 and the take-up reel table 32 are freely rotatable.

When the loading motor 35 is slightly rotated (for example, about 90 degrees) in the cancellation direction under this state, the engagement lever 36 swings in the direction of the arrow 39 to cancel the engagement between the mode switch lever 33 and the engagement lever 36. As a result, the mode switch lever 33 is moved by a predetermined distance in the direction of the arrow 38 by the tension of the spring 37. Therefore, the cam pin 422 is caused to drop into a recess 331 along the cam face 335 by the tension of the spring 415, and the cam pin 432 is caused to drop into a recess 332 along the cam face 335 by the tension of the spring 435, with the result that the brake lever 41 swings in the direction along which a brake is applied to the supply reel table 31. Therefore, the magnetic tape which has been running at a high speed in the fast-forwarding state or the rewinding state stops without causing slackening.

Namely, the brake mechanism section can stop the running of the magnetic tape without causing slackening, simply by applying the driving output 23 for rotating the loading motor 35 in the cancellation direction to the loading motor 35 for a very short time period. In other words, when a power failure is detected at a timing when an electric power which allows the loading motor 35 to be slightly rotated in the cancellation direction remains in a DC power source generating a DC output, the running of the magnetic tape can be stopped without causing slackening, by the remaining electric power.

With respect to the driving force for swinging the engagement lever 36 in the direction of the arrow 39, a configuration using a plunger may be used. Any other configuration may be used as far as the non-brake state of the reel tables 31 and 32 can be transferred to the brake state by using an electric power remaining after a power failure is detected.

Figure 1:
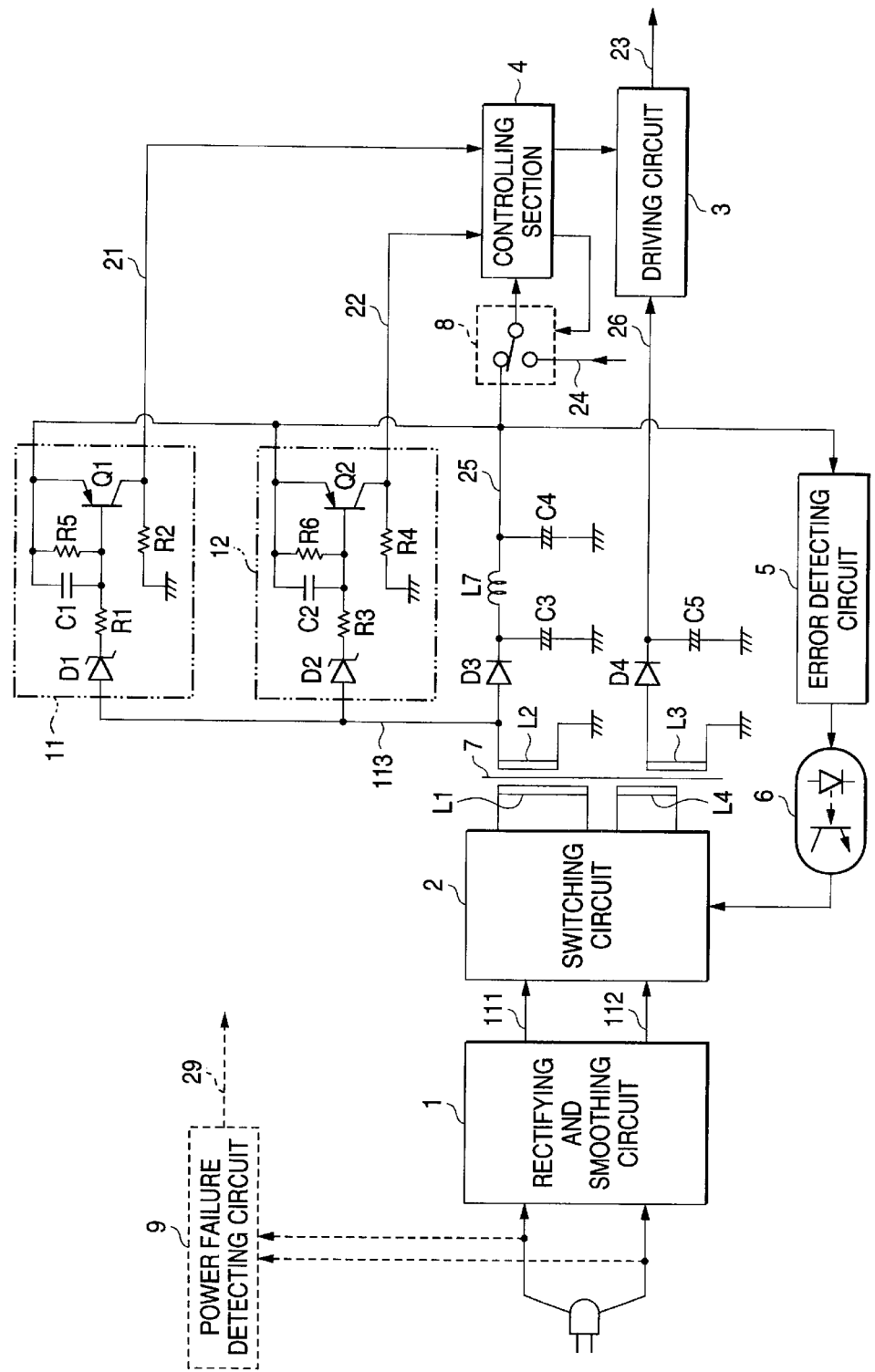
FIG. 1 is a circuit diagram showing the electrical connection in an embodiment of the magnetic tape drive of the invention.

FIG. 1 is a circuit diagram showing the electrical connection in the embodiment.

The configuration roughly comprises an RCC switching power source which generates two kinds of DC outputs, a first power failure detecting section 11, a second power failure detecting section 12, a controlling section 4, a driving circuit 3, and a switch 8.

Specifically, a rectifying and smoothing circuit 1 is a block which rectifies and smoothes a commercial power source to produce a primary DC source (the plus side is indicated by 111, and the reference level side is indicated by 112). In the circuit, immediately after a power failure, a sufficient amount of charges remain in a smoothing capacitor. A switching circuit 2 is a block in which self oscillation is performed by a primary coil L1 wound in a transformer 7 and an auxiliary coil L4, thereby switching the current flowing through the primary coil L1. When the switching is changed in accordance with an output of a photocoupler 6, the voltage of a DC output 25 is stabilized to a predetermined value (for example, 5 V).

A rectifying and smoothing circuit consisting of a diode D3, an inductor L7, and capacitors C3 and C4 is connected to a secondary coil L2 wound in the transformer 7, to generate the DC output 25 from the output of the secondary coil L2 when the switching circuit 2 is in the off state. A rectifying and smoothing circuit consisting of a diode D4 and a capacitor C5 is connected to a secondary coil L3 wound in the transformer 7, to generate a DC output 26 from the output of the secondary coil L3 when the switching circuit 2 is in the off state.

An error detecting circuit 5 drives a light emitting diode of a photocoupler 6 by a current corresponding to a voltage error of the DC output 25, thereby feedbacking the voltage error of the DC output 25 to the switching circuit 2.

The first power failure detecting section 11 is a block which, when the switching circuit 2 is in the on state, transmits a first power failure detection signal 21 on the basis of the voltage of the secondary coil L2 wound in the transformer 7. Therefore, the section comprises a Zener diode D1 in which the anode is connected to the secondary coil L2 and the cathode is connected to the base of a PNP transistor Q1 via a resistor R1. A capacitor C1 for holding the base voltage is connected between the emitter and the base of the PNP transistor Q1. A resistor R5 which pulls up the base voltage toward the emitter voltage, and through which charges of the capacitor C1 are to be discharged is connected in parallel to the capacitor C1. A resistor R2 is connected between the collector of the PNP transistor Q1 and the ground level.

The first power failure detecting section 11 is configured as described above. When the minus value of the voltage of the secondary coil L2 is larger (the absolute value of the minus value is larger) than a voltage which is set by the Zener voltage of the Zener diode D1, therefore, the base current flows through the PNP transistor Q1 so that the PNP transistor Q1 is turned on. Namely, the first power failure detection signal 21 has the H level indicative of the non-power failure state. When a power failure occurs and the minus value of the voltage of the secondary coil L2 is smaller than the voltage which is set by the Zener voltage of the Zener diode D1, the base current of the PNP transistor Q1 is zero, and the PNP transistor Q1 is turned off. Namely, the first power failure detection signal 21 has the L level indicative of the power failure state.

The second power failure detecting section 12 is a block which, when a power failure occurs, transmits a second power failure detection signal 22 (sets the second power failure detection signal 22 to the L level) at a timing which is later than that when the first power failure detecting section 11 transmits the first power failure detection signal 21 (sets the first power failure detection signal 21 to the L level). The second power failure detecting section 12 is configured in the same manner as the first power failure detecting section 11 except that the Zener voltage (5.1 V) of a Zener diode D2 is lower than the Zener voltage (6.8 V) of the Zener diode D1. Therefore, its detailed description is omitted.

The controlling section 4 is a block which controls principal operations of the video cassette recorder, and configured by a microcomputer having a normal mode and a sleep mode in which the power consumption is smaller than that in the normal mode.

The switch 8 is a switch in which, when the second power failure detection signal 22 is transmitted, the connection is changed from the side of the DC output 25 to the side of a sleep power source 24 by the controlling section 4. In the switch 8, also when the user instructs the power source to be turned off, the connection is changed from the side of the DC output 25 to the side of the sleep power source 24. At the same time, the controlling section 4 performs a control of lowering the voltages of the DC outputs 25 and 26 (circuitry for this purpose is not shown).

The driving circuit 3 is a block which uses the DC output 26 as the operation power source, and which transmits the driving output 23 for driving the loading motor 35 shown in FIG. 2, in accordance with instructions from the controlling section 4. When a power failure occurs in the fast-forwarding state or the rewinding state and an instruction for braking is hence issued by the controlling section 4, therefore, the driving circuit 3 transmits the driving output 23 for rotating the loading motor 35 in the cancellation direction to the loading motor 35.

The switching power source may have any other configuration (for example, a switching power source of the external oscillation type) in which the output is taken out from the secondary coil L2 when the switching circuit for switching the current flowing through the primary coil L1 is in the off state.

Figure 3:
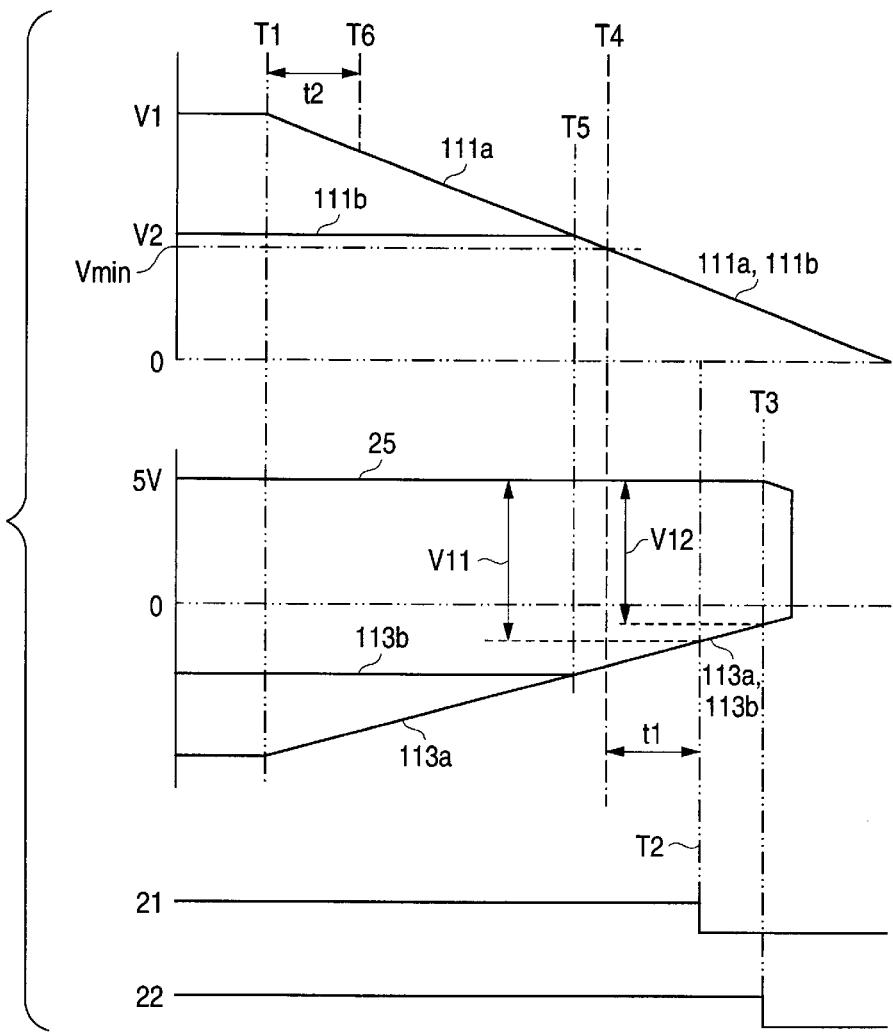
FIG. 3 is a view showing changes of principal signals in the embodiment.

FIG. 3 is a view showing changes of principal signals in the embodiment. The operation of the embodiment will be described with reference to the figure as required.

In FIG. 3, a voltage Vmin indicates the minimum value of the primary DC source 111 which is specified in a standard. It means that, when the voltage of the commercial power source is so low that the voltage of the primary DC source 111 is lower than Vmin, the operation cannot be guaranteed.

The reference numeral 111a indicates the voltage change of the primary DC source 111 in the case where, when the voltage of the commercial power source is sufficiently high and the voltage of the primary DC source 111 is V1, a power failure occurs at time T1, and 113a indicates the voltage change of the secondary coil L2 in the case where, when the voltage of the primary DC source 111 exhibits the change indicated by 111a, the switching circuit 2 is in the on state.

The reference numeral 111b indicates the voltage change of the primary DC source 111 in the case where, when the voltage of the commercial power source is low and the voltage of the primary DC source 111 is V2 in the vicinity of the standardized minimum value (the voltage Vmin), a power failure occurs at time T5, and 113b indicates the voltage change of the secondary coil L2 in the case where, when the voltage of the primary DC source 111 exhibits the change indicated by 111b, the switching circuit 2 is in the on state.

The reference numeral 25 indicates the voltage change of the DC output 25 in the case where the voltage of the primary DC source 111 exhibits the change indicated by 111a or that indicated by 111b.

Hereinafter, the timing of transmitting the first power failure detection signal 21 will be described. When a power failure occurs, the electric power remaining after the power failure is further reduced as the time elapses. In order to sufficiently ensure the electric power for transferring the state of the brake mechanism section from the non-brake state to the brake state, therefore, there is the latest timing when the transfer from the non-brake state to the brake state cannot be made later. The time T2 shows this timing.

The first power failure detecting section 11 is configured so that the timing of transmitting the first power failure detection signal 21 can be made later or earlier by changing the Zener voltage of the Zener diode D1. In the case where an element of a Zener voltage of 6.8 V is employed as the Zener diode D1, when the difference between the voltage of the secondary coil L2 and that of the DC output 25 becomes smaller than the voltage V11, the PNP transistor Q1 is changed from the on state to the off state. Therefore, the first power failure detecting section 11 transmits the first power failure detection signal 21 at the time T2.

The second power failure detection signal 22 is a signal indicative of the timing when the controlling section 4 is transferred from the normal mode to the sleep mode. Therefore, the timing when the second power failure detecting section 12 transmits the second power failure detection signal 22 is determined so as to be late (time T3) and within the range where the voltage of the DC output 25 satisfies the standard of the operation power source of the microcomputer constituting the controlling section 4.

The second power failure detecting section 12 is configured so that the timing of transmitting the second power failure detection signal 22 can be made later or earlier by changing the Zener voltage of the Zener diode D2. In the case where an element of a Zener voltage of 5.1 V is employed as the Zener diode D2, when the difference between the voltage of the secondary coil L2 and that of the DC output 25 becomes smaller than the voltage V12, the PNP transistor Q2 is changed from the on state to the off state. Therefore, the second power failure detecting section 12 transmits the second power failure detection signal 22 at the time T3.

As described above, in the case where the voltage of the primary DC source 111 in the non-power failure state is V1, when a power failure occurs at the time T1, the first power failure detection signal 21 is transmitted at the time T2. On the other hand, when the first power failure detection signal 21 is transmitted in the fast-forwarding state or the rewinding state, the controlling section 4 gives to the driving circuit 3 an instruction of an output for rotating the loading motor 35 in the cancellation direction. At the time T2, therefore, the driving circuit 3 generates the driving output 23 for rotating the loading motor 35 in the cancellation direction, by using the remaining electric power, and outputs the generated output. Consequently, the loading motor 35 is rotated in the cancellation direction.

As a result, the engagement between the engagement lever 36 and the mode switch lever 33 is cancelled, and the supply reel table 31 and the take-up reel table 32 are hence changed from the non-brake state to the brake state. Therefore, the magnetic tape which has been running at a high speed stops without causing slackening. By contrast, when the voltage of the primary DC source 111 is further lowered (time T3), the second power failure detecting section 12 transmits the second power failure detection signal 22. Therefore, the controlling section 4 controls the switch 8 so that its connection is switched from the side of the DC output 25 to the side of the sleep power source 24. Then, the operation mode is changed from the normal mode to the sleep mode.

On the other hand, in the case where the voltage of the primary DC source 111 in the non-power failure state is V2, when a power failure occurs at the time T5, the first power failure detection signal 21 is transmitted at the time T2. When the first power failure detection signal 21 is transmitted in the fast-forwarding state or the rewinding state, the controlling section 4 gives to the driving circuit 3 an instruction for rotating the loading motor 35 in the cancellation direction. As a result, the supply reel table 31 and the take-up reel table 32 are changed from the non-brake state to the brake state. Therefore, the magnetic tape which has been running at a high speed stops without causing slackening. When the second power failure detection signal 22 is transmitted (time T3), the controlling section 4 controls the switch 8 so that its connection is switched from the side of the DC output 25 to the side of the sleep power source 24. Then, the operation mode is changed from the normal mode to the sleep mode.

As seen from the above description, as the degree by which the voltage of the primary DC source 111 is higher than the voltage Vmin is larger, the period from the time when a power failure occurs, to that when the first power failure detection signal 21 is transmitted becomes longer. This produces the following advantage.

The period of an instantaneous power failure scatters in a range from several mS to about 100 mS. By contrast, in the case where the voltage of the commercial power source is in the vicinity of a standard value and the voltage of the primary DC source 111 is high, a sufficiently long time period elapses after a power failure occurs, and before the first power failure detection signal 21 is transmitted. When the power failure is eliminated during this time period, the first power failure detection signal 21 is not transmitted. In the case where the voltage of the commercial power source is in the vicinity of the standard value, therefore, the possibility that, even when an instantaneous power failure occurs, the first power failure detection signal 21 is not transmitted is high. From the viewpoint of the user, the possibility that, even when an instantaneous power failure occurs, the operation in the non-power failure state is continued is high, and hence the drive is convenient for use.

Moreover, the time period from the occurrence of a power failure to the transmission of the second power failure detection signal 22 is longer than that from the occurrence of the power failure to the transmission of the first power failure detection signal 21. Therefore, the possibility that, even when an instantaneous power failure occurs, the second power failure detection signal 22 is not transmitted is higher.

Therefore, the controlling section 4 may be configured so that, when the second power failure detection signal 22 is not transmitted during a predetermined period after the first power failure detection signal 21 is transmitted and the state of the brake mechanism section is transferred from the non-brake state to the brake state, the fast-forwarding or rewinding operation is restarted. In this configuration, also when the time period of an instantaneous power failure is relatively long, the fast-forwarding or rewinding operation is automatically performed until it is completed. Therefore, the drive is further convenient for use.

In the above, the configuration in which the mode is transferred to the sleep mode when the second power failure detection signal 22 is transmitted has been described. Alternatively, a configuration may be used in which the second power failure detecting section 12 is omitted, and the mode is transferred to the sleep mode when a predetermined time period elapses after the first power failure detection signal 21 is transmitted.

The first power failure detecting section may have a configuration in which, as indicated by 9 in FIG. 1, a power failure is detected on the basis of the commercial power source (for example, a configuration in which, when a power failure occurs at the time T1, a first power failure detection signal 29 is immediately output). In the case where the first power failure detecting section is configured in this way, when the first power failure detection signal 29 is transmitted, the controlling section 4 performs a control of transferring the non-brake state of the brake mechanism section to the brake state when a time period t1 (assuming that a power failure occurs when the voltage of the primary DC source 111 is Vmin, the allowable longest period which can elapse after the occurrence of the power failure and before the first power failure detection signal 29 is transmitted) elapses.

In the case where the voltage of the primary DC source 111 in the non-power failure state is V1, when a power failure occurs at the time T1, for example, a control of transferring the state of the brake mechanism section from the non-brake state to the brake state is performed at time T6 when a time period 2 which is equal to the time period t1 has elapsed from the time T1. In other words, irrespective of the value of the voltage of the primary DC source 111, when a power failure is not eliminated within the time period t1 after the power failure occurs, a control of transferring the non-brake state of the brake mechanism section to the brake state is performed.

Effects of the Invention

As described above, the invention is applied to a magnetic tape drive comprising a brake mechanism section which can transfer a state of a reel table from a non-brake state to a brake state by using an electric power that remains after a start of a power failure of a commercial power source, wherein the magnetic tape drive further comprises: a first power failure detecting section which, when a power failure of the commercial power source is detected, transmits a first power failure detection signal; and a controlling section which, when the first power failure detection signal is transmitted in a fast-forwarding state or a rewinding state, transfers the non-brake state of the brake mechanism section to the brake state. When a power failure occurs in a fast-forwarding state or a rewinding state, therefore, the state of the brake mechanism section is transferred from the non-brake state to the brake state. As a result, even when a power failure occurs in the fast-forwarding state or the rewinding state, the magnetic tape can be prevented from slackening.

Furthermore, the invention is applied to a magnetic tape drive wherein the magnetic tape drive further comprises a switching power source which, when a switching circuit for switching a current flowing through a primary coil of a transformer is in an off state, takes out an output from a secondary coil of the transformer, and the first power failure detecting section transmits the first power failure detection signal on the basis of a voltage of the secondary coil of the transformer when the switching circuit is in an on state. Therefore, the first power failure detecting section can detect a power failure before the DC output voltage of the switching power source is lowered. In other words, the first power failure detection signal can be transmitted at a time when a large electric power remains in the switching power source. Therefore, the remaining electric power for transferring the state of the reel table from the non-brake state to the brake state can be sufficiently ensured.

Furthermore, the invention is applied to a magnetic tape drive wherein the controlling section is configured by a microcomputer having a normal mode, and a sleep mode which consumes a less power than the normal mode, the magnetic tape drive further comprises a second power failure detecting section which, when a power failure occurs, transmits a second power failure detection signal at a timing which is later than a timing when the first power failure detecting section transmits the first power failure detection signal, and also in a case where the first power failure detection signal is transmitted, the controlling section continues the normal modes when the second power failure detection signal is not transmitted, and is transferred from the normal mode to the sleep mode when the second power failure detection signal is transmitted. When a power failure is eliminated during a period from the transmission of the first power failure detection signal to that of the second power failure detection signal, therefore, the transfer to the sleep mode is not performed. Consequently, also when the time period of an instantaneous power failure is relatively long, the mode is prevented from being transferred to the sleep mode.

What is claimed is:

1. A magnetic tape drive comprising:

a brake mechanism section which can transfer a state of a reel table from a non-brake state to a brake state by using an electric power that remains after a start of a power failure of a commercial power source;

a first power failure detecting section which, when a power failure of said commercial power source is detected, transmits a first power failure detection signal;

a controlling section which, when the first power failure detection signal is transmitted in a fast-forwarding state or a rewinding state, transfers the non-brake state of said brake mechanism section to the brake state; and a switching power source which, when a switching circuit for switching a current flowing through a primary coil of a transformer is in an off state, takes out an output from a secondary coil of said transformer, wherein said first power failure detecting section transmits the first power failure detection signal on the basis of a voltage of said secondary coil of said transformer when said switching circuit is in an on state.

2. A magnetic tape drive comprising:

a brake mechanism section which can transfer a state of a reel table from a non-brake state to a brake state by using an electric power that remains after a start of a power failure of a commercial power source;

a first power failure detecting section which, when a power failure of said commercial power source is detected, transmits a first power failure detection signal;

a controlling section which, when the first power failure detection signal is transmitted in a fast-forwarding state or a rewinding state, transfers the non-brake state of said brake mechanism section to the brake state; and a second power failure detecting section which, when a power failure occurs, transmits a second power failure detection signal at a timing which is later than a timing when said first power failure detecting section transmits the first power failure detection signal, wherein said controlling section comprises a microcomputer having a normal mode, and a sleep mode which consumes a less power than the normal mode, and also in a case where the first power failure detection signal is transmitted, said controlling section continues the normal modes when the second power failure detection signal is not transmitted, and is transferred from the normal mode to the sleep mode when the second power failure detection signal is transmitted.

* * * * *